United States Patent
Fest et al.

(10) Patent No.: US 7,980,291 B2
(45) Date of Patent: Jul. 19, 2011

(54) DEVICE FOR KEEPING WARM SLABS EMERGING FROM A CONTINUOUS CASTING INSTALLATION

(75) Inventors: Thomas Fest, Pittsburg, PA (US); Erich Hovestädt, Rhede (DE); Wolfgang Mossner, Erkrath (DE)

(73) Assignee: SMS Siemag AG, Düsseldorf (DE)

( * ) Notice: Subject to any disclaimer, the term of this patent is extended or adjusted under 35 U.S.C. 154(b) by 138 days.

(21) Appl. No.: 12/310,569

(22) PCT Filed: Aug. 13, 2007

(86) PCT No.: PCT/DE2007/001462
§ 371 (c)(1),
(2), (4) Date: Apr. 7, 2009

(87) PCT Pub. No.: WO2008/025325
PCT Pub. Date: Mar. 6, 2008

(65) Prior Publication Data
US 2010/0230067 A1    Sep. 16, 2010

(30) Foreign Application Priority Data

Sep. 1, 2006 (DE) .......................... 10 2006 041 150
Mar. 27, 2007 (DE) .......................... 10 2007 016 100

(51) Int. Cl.
*B22D 45/00* (2006.01)

(52) U.S. Cl. .......... 164/269; 164/417; 164/477
(58) Field of Classification Search .......... 164/269, 164/417, 477
See application file for complete search history.

(56) References Cited

U.S. PATENT DOCUMENTS

| | | | |
|---|---|---|---|
| 4,147,506 A * | 4/1979 | Southern et al. | 432/148 |
| 4,462,456 A | 7/1984 | Kameyama et al. | |
| 6,018,855 A | 2/2000 | Drigani et al. | |

FOREIGN PATENT DOCUMENTS

| | | |
|---|---|---|
| DE | 3201417 | 1/1986 |
| EP | 0 042 656 | 8/1984 |
| EP | 0 648 552 | 10/1997 |
| JP | 62-222015 | 9/1987 |

* cited by examiner

*Primary Examiner* — Kuang Y Lin
*Assistant Examiner* — Nicholas P D'Aniello
(74) *Attorney, Agent, or Firm* — Cohen Pontani Lieberman & Pavane LLP

(57) ABSTRACT

An arrangement for maintaining the warmth of slabs which exit from a continuous casting installation and which can be transported on a roller table for further processing. In order to optimize the thermal balance between the continuous casting installation and the hot rolling mill, a supporting part is provided for receiving a slab, which supporting part can be placed on the roller table and transported thereon, and an insulating box which can be placed upon the supporting part and which substantially encloses the latter.

10 Claims, 6 Drawing Sheets

DEVICE FOR KEEPING WARM SLABS EMERGING FROM A CONTINUOUS CASTING INSTALLATION

PRIORITY CLAIM

This is a U.S. national stage of application No. PCT/DE2007/001462, filed on 13 Aug. 2007. Priority is claimed on the following applications: Country: Germany, Application No.: 10 2006 041 150.1, Filed: 1 Sep. 2006; Country: Germany, Application No.: 10 2007 016 100.1, Filed: 27 Mar. 2007, the contents of which are incorporated here by reference.

BACKGROUND OF THE INVENTION

1. Field of the Invention

The invention is directed to an arrangement for maintaining the warmth of slabs which exit from a continuous casting installation and which can be transported on a roller table for further processing.

2. Description of the Prior Art

One of the greatest cost-driving factors in steel mills and continuous casting installations is the energy that is used, for the most part, to generate heat.

The great amount of energy used for melting is lost to the steel in the continuous casting installation for the sake of bringing about solidification. Following this process, an equally energy-intensive reheating is necessary in order to reach a required input temperature for a hot rolling process.

It is known from DE 43 33 717 to provide heatable warming hoods for the transporting of coils, these heatable warming hoods are connected to transverse transporting vehicles so as to form a constructional unit.

Further, it is also known from EP 648 552 B1 to provide movable conveyers for slabs comprising a movable bottom part with rollers upon which the slabs lie and an insulated hood which can be placed upon the bottom part.

SUMMARY OF THE INVENTION

It is an object of the invention to keep the slab as hot as possible by optimizing the balance of energy of the process between the continuous casting installation and the hot rolling mill so that the average caloric temperature is as high as possible. In so doing, as much heat as possible should be preserved up to the insertion of the slab into the rolling mill in order to minimize costs for reheating.

The above-stated object is met by an arrangement for maintaining the warmth of slabs that exit from a continuous casting installation and can be transported on a roller table for further processing. This arrangement is characterized by a supporting part for receiving a slab, which supporting part can be placed on the roller table and transported thereon, and an insulating box which can be placed upon the supporting part and which substantially encloses the latter.

A strand continuously exits from a continuous casting installation in the shape of a slab, for example, and is then separated into individual slabs or slab segments. The transporting is generally carried out on a roller table directly adjoining the roller guide of the strand guide. This also applies to the further transport when, for example, inline rolling is carried out downstream. The arrangement according to the invention is useful for preventing interim temperature losses.

According to one embodiment of the invention, two insulating boxes per strand are required for normal operation or, when using three insulating boxes per strand, for example, there is at least one "parking position" in which an insulating box allows another insulating box to pass.

Alternatively, it may be very advantageous to use insulating boxes directly as an intermediate storage provided the buffer period does not exceed several hours.

It is conceivable to provide the insulating boxes additionally with heating arrangements. This heating arrangement may be a burner or an electric resistance heater.

Another possibility consists in induction heating or intermediate insertion in a roller hearth furnace which assumes the task of preserving and homogenizing the temperature.

Transporting can also be carried out with the insulating boxes that are charged immediately following the continuous casting installation and discharged immediately before the induction heating/roller hearth furnace combination.

Further, a transporting of packages, that is, stacked slabs, is also possible with the insulating boxes. An advantage of transporting in packages is that the furnace of the rolling mill can be charged with a plurality of products simultaneously. The furnace need only be opened once for a plurality of products and need not be opened separately for each product so that appreciably less heat is lost.

BRIEF DESCRIPTION OF THE DRAWINGS

The invention will be described more fully in the following with reference to the drawings.

DETAILED DESCRIPTION OF THE PRESENTLY PREFERRED EMBODIMENTS

Figure 1:
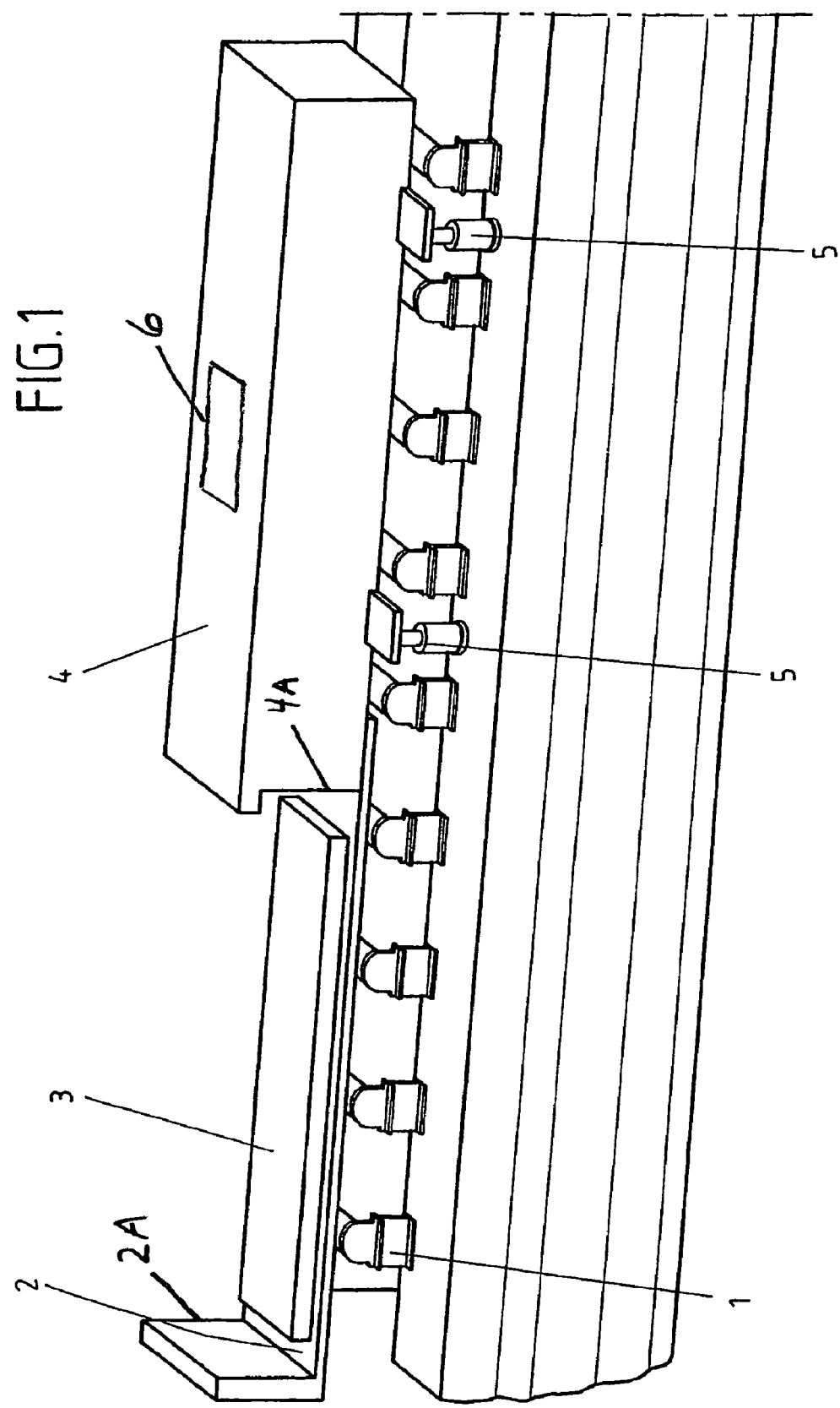
FIG. 1 is an arrangement according to one embodiment of the invention in an open state.
Figure 2:
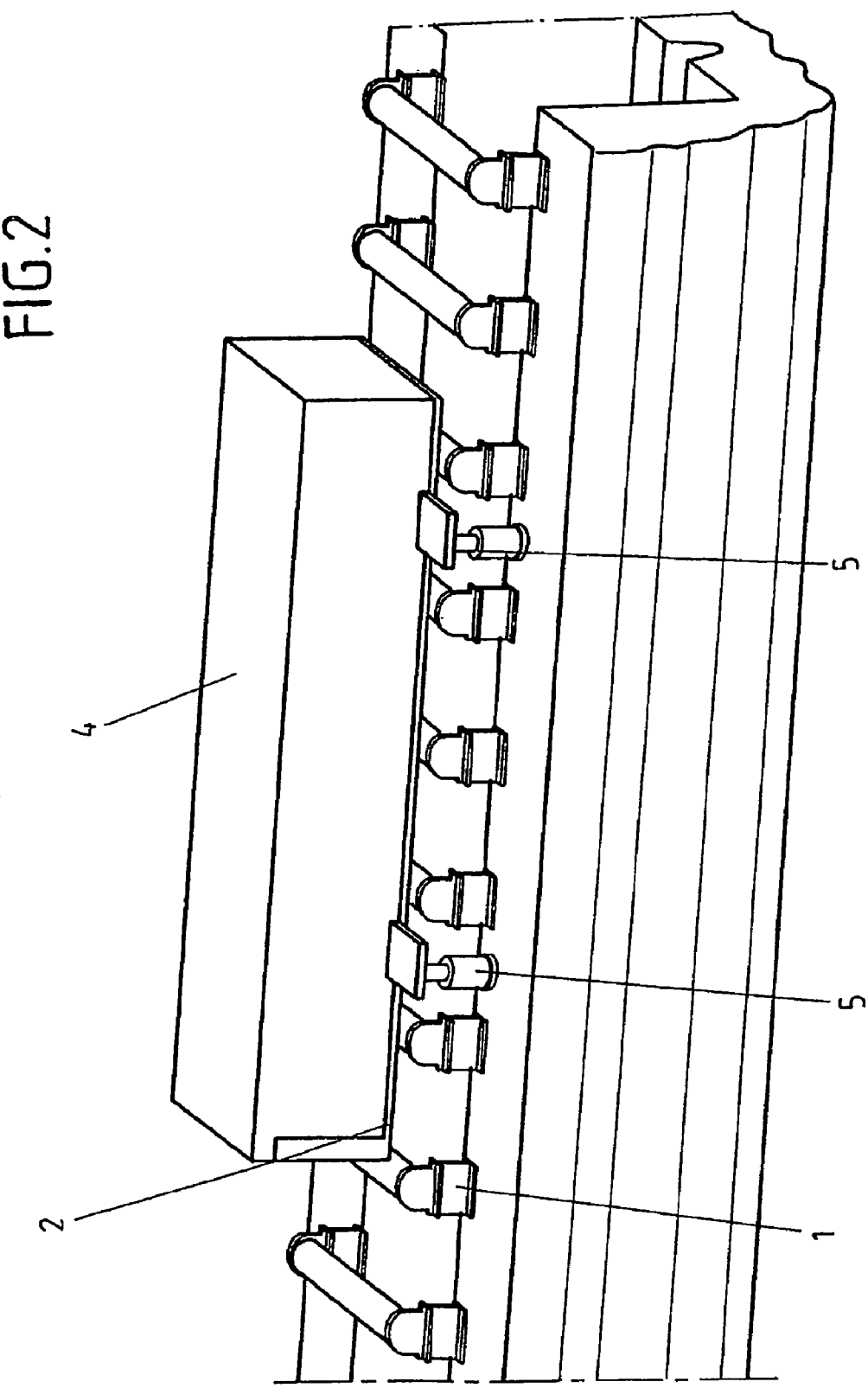
FIG. 2 is an arrangement according to one embodiment of the invention in a closed state.
Figure 3:
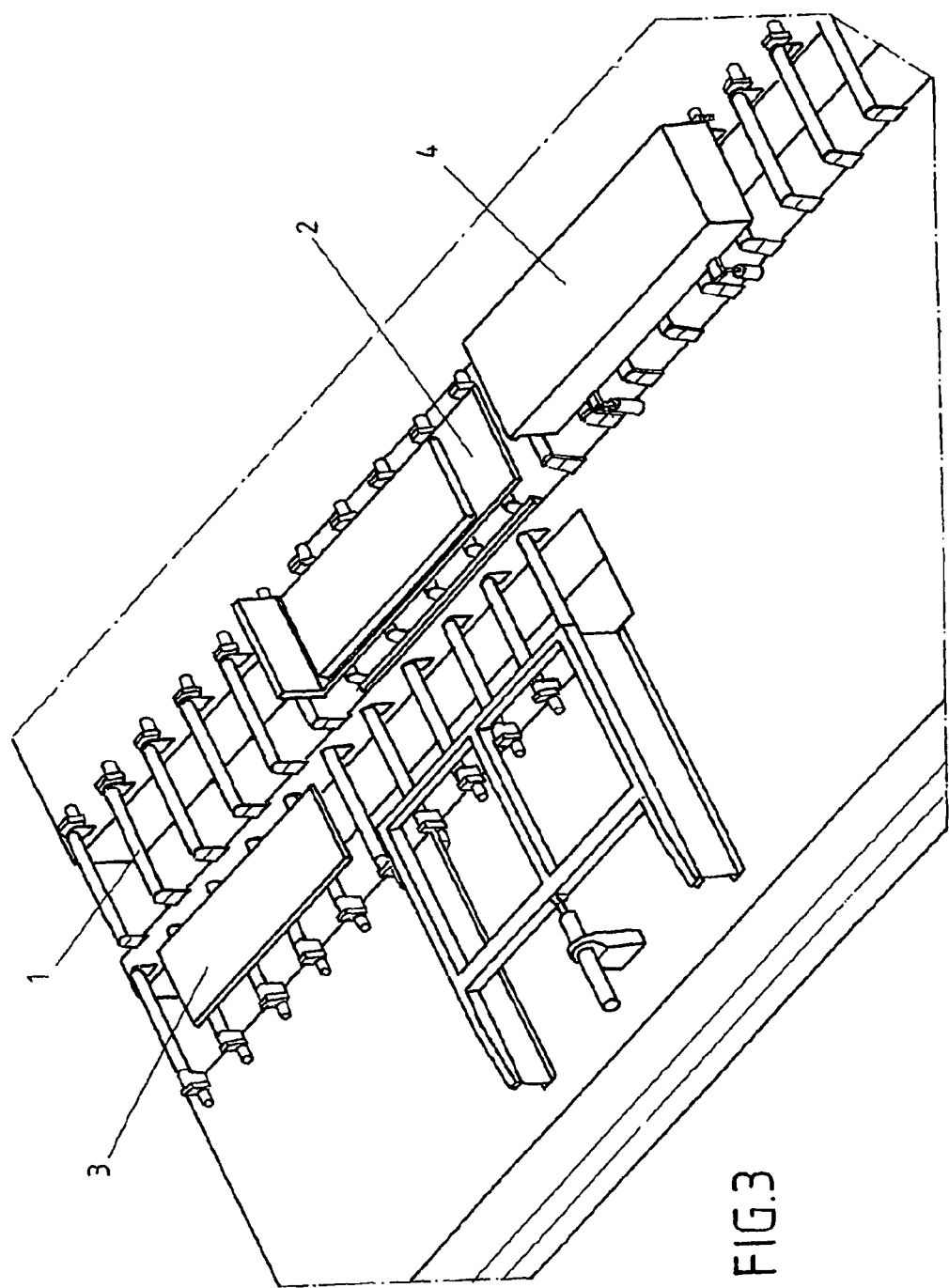
FIGS. 3 to 6 are the charging of the arrangement according to one embodiment of the invention in different phases by way of example.

An arrangement according to one embodiment of the invention is shown in FIG. 1 for maintaining the warmth of slabs, which exit from a continuous casting installation, comprises an insulated supporting part 2 which receives a slab 3 and can be conveyed on a roller table 1 and an insulating box 4 in which the supporting part 2 can be inserted. For this purpose, the insulating box 4 is tunnel-shaped, that is, open in longitudinal direction and, therefore, in direction of the roller table 1, while the other side is closed. Accordingly, the supporting part 2 which has at one end a terminating wall 2A whose dimensions correspond to the clearance opening 4A of the insulating box 4 can be inserted into the insulating box 4 and closes it from this side as shown in FIG. 2.

In the embodiment form shown in the drawings, a lifting device is provided for the insulating box 4 in order to allow the supporting part, to be pushed or inserted into the insulating box 4. This lifting device comprises lifting cylinders 5 arranged alongside of and parallel to the roller table 1. The insulating box 4 can be lifted slightly above the height of the roller table 1 by these lifting cylinders 5 so that the supporting part can be conveyed farther on the roller table 1 until it is situated below the insulating box 4.

The entire arrangement comprising the supporting part 2 with the slab 3 or slabs located thereon and the insulating box can then be conveyed farther on the roller table 1 to the next work station.

The drawings do not show the construction of the insulating box 4, which is beyond the scope of the application, which can be provided with heating devices and/or cooling devices 6.

Figure 4:
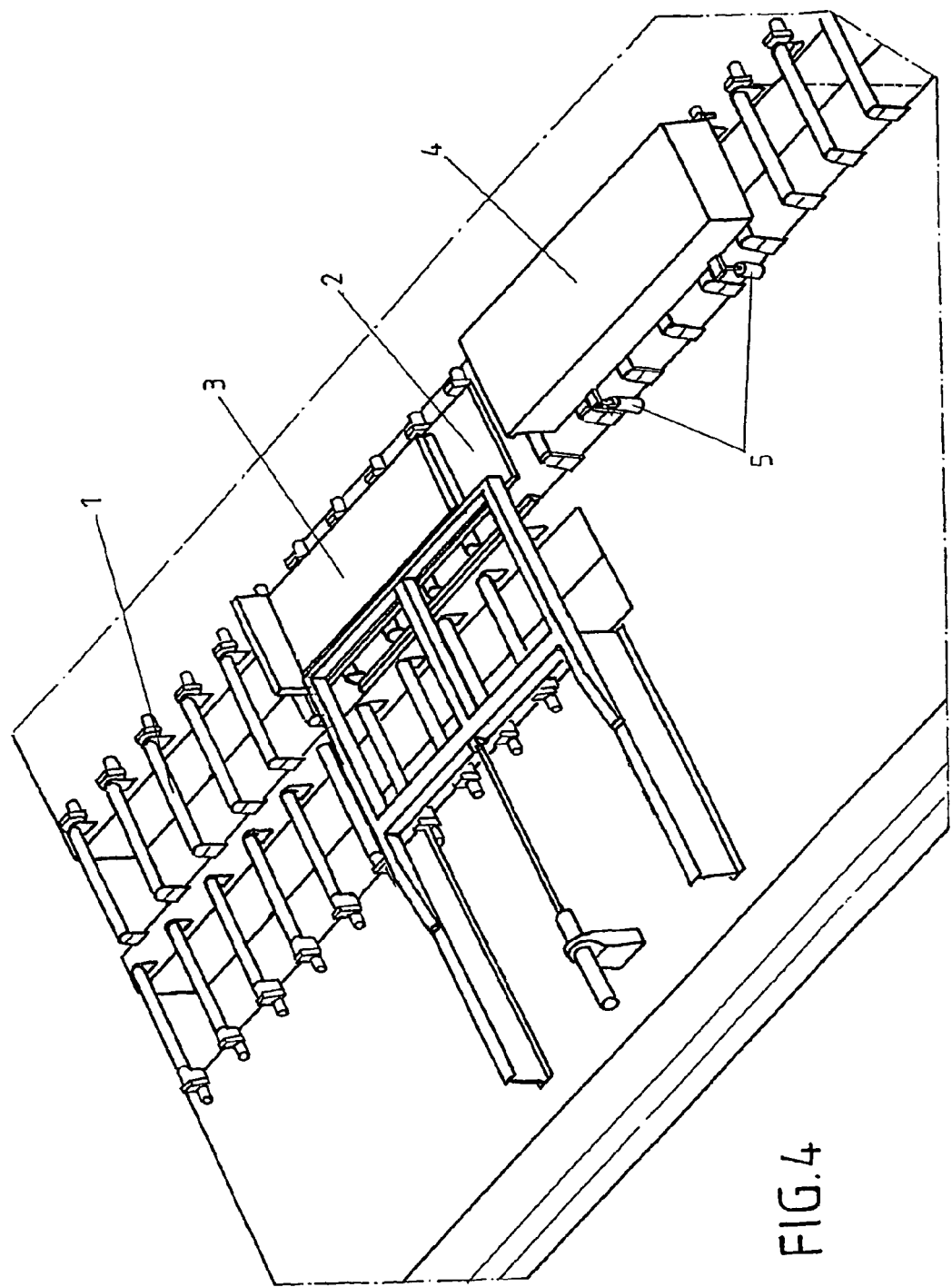
Figure 5:
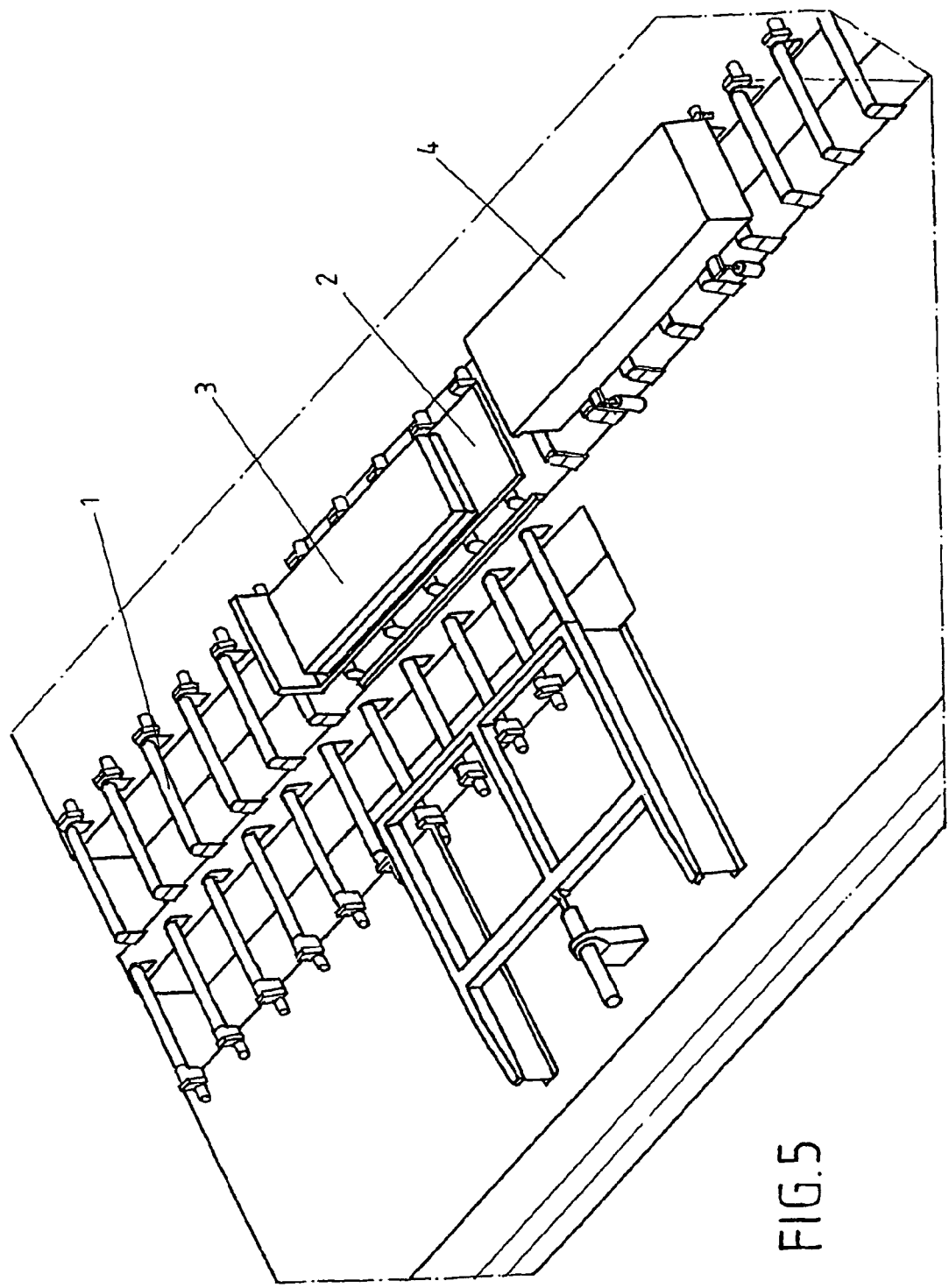
Figure 6:
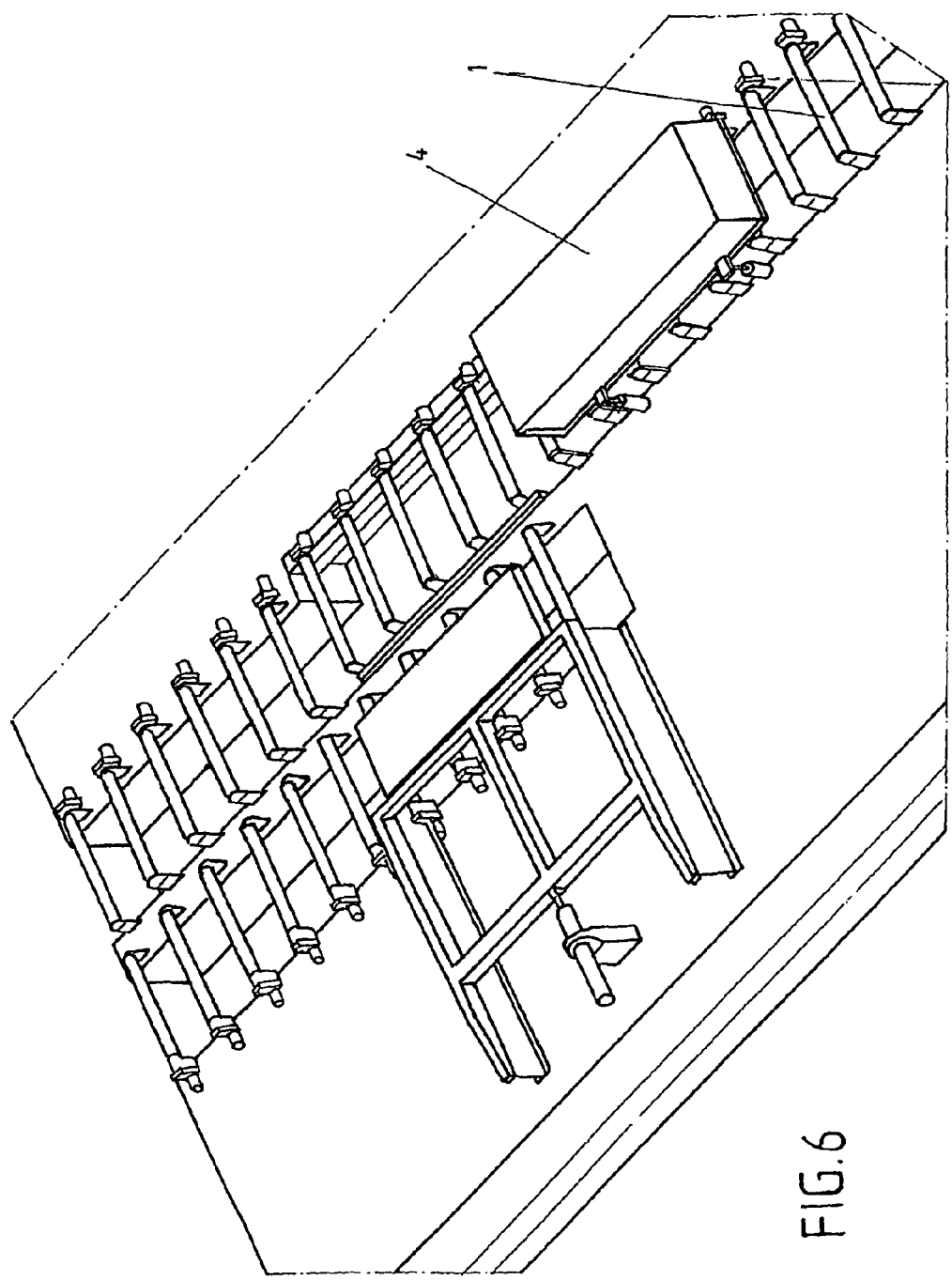

FIGS. 3 to 6 show an example of a charging station for the supporting part. In particular, the slab 3 is advanced from the casting device to the roller table 1. When the slab 3 is transported from the casting device and is then conveyed farther on the roller table 1, a transverse displacement must be carried out for charging. A parallel roller table is provided for this purpose. This transverse displacement allows the supporting part to be made ready and the slab 3 to be advanced and pushed across onto the supporting part as can be seen from FIGS. 3 and 4. When the slab 3 is located on the supporting part 2—as is shown in FIG. 5—this supporting part 2 can then be displaced on the roller table, in direction of the lifted insulating box 4 and inserted into the latter (FIG. 6).

During this placement, the supporting part 2 lies on a roller table, which can be raised and lowered so that a plurality of slabs 3 can also be conveyed, one on top of the other. This is shown in FIG. 4, where a second slab 3 has been placed on top. In the drawing, the roller table 1, including the supporting part 2 and two slabs 3 is lifted again and the insertion into the insulating box 4 is then carried out.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement for keeping a slab that exits from a continuous casting installation warm, the arrangement comprising:
    a first roller table configured to transport the slab;
    a supporting part configured to receive the slab, and configured to be transported on at least the first roller table; and
    an insulating box configured to be placed upon the supporting part, the insulating box substantially enclosing the slab received on the supporting part, wherein the supporting part comprises a support wall extending substantially perpendicular to a longitudinal direction of the supporting part, wherein
    the insulating box comprises a cover wall, two longitudinal walls extending parallel to a longitudinal direction of the supporting part substantially perpendicular to the cover wall, and a front end wall substantially perpendicular to the cover wall and the longitudinal walls, and
    wherein the supporting part, the two longitudinal walls, the support wall, the cover wall, and the front end wall are configured to form a completely enclosed interior space.

2. The arrangement according to claim 1, wherein the insulating box further comprises at least one of a heating device and a cooling device.

3. The arrangement according to claim 1, wherein the insulating box is configured to be pushed horizontally onto the supporting part.

4. The arrangement according to claim 1, wherein the insulating box is configured to be placed on the supporting part vertically.

5. The arrangement according to claim 1, wherein the insulating box is configured to be lifted vertically relative to the supporting part and the supporting part is configured to be pushed horizontally out of and into the insulating box.

6. An arrangement for keeping a slab that exits from a continuous casting installation warm, the arrangement comprising:
    a first roller table configured to transport the slab;
    a supporting part configured to receive the slab, and configured to be transported on at least the first roller table; and
    an insulating box configured to be placed upon the supporting part, the insulating box substantially enclosing the slab received on the supporting part, wherein the first roller table further comprises:
    a transverse displacement device configured to laterally displace the slab from the first roller table to a supporting part on a second roller table substantially parallel to the roller table at the transverse displacement, and
    a receiving device elevated over a plane of the first roller table configured to retain the insulating box so that the supporting part can be pushed under the insulating box, and the insulating box can then be lowered onto the supporting part so that the insulating box and the supporting part are transported together.

7. The arrangement according to claim 6, wherein an area of the roller table at the transverse displacement device is configured to be raised and lowered with respect to the plane of the roller table.

8. The arrangement according to claim 6, wherein the receiving device for the insulating box comprises at least one lifting cylinders arranged on a side of the roller table.

9. The arrangement according to claim 6, further comprising a parking position adjacent to one of the first and the second roller tables configured to store the supporting part and insulating box for another supporting part and insulating box to pass the parking position on the one of the first and the second roller tables.

10. The arrangement according to claim 6, wherein the heating device is at least one of a burner and an electric resistance heater.

* * * * *